Figure 1:
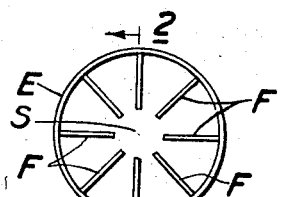

June 9, 1959  P. C. RUGGLES  2,890,375
COLLECTOR ELECTRODES FOR KLYSTRON TUBES
Filed Oct. 17, 1955

INVENTOR:
Percy Charles Ruggles
BY: Baldwin + Wight
ATTORNEY:

United States Patent Office 2,890,375
Patented June 9, 1959

2,890,375

COLLECTOR ELECTRODES FOR KLYSTRON TUBES

Percy Charles Ruggles, Great Baddow, England, assignor to English Electric Valve Company Limited, London, England, a British company Application October 17, 1955, Serial No. 540,942

Claims priority, application Great Britain July 25, 1955

3 Claims. (Cl. 315—5.38)

This invention relates to collector electrodes for klystron tubes and has for its object to provide improved collector electrodes which for a given efficiency of operation when fitted in the tube will be of substantially shorter length than collector electrodes as at present known and will, therefore, enable the tube itself to be made of smaller length.

The design of the collector electrodes of a klystron tube is a major factor in beam efficiency, that is in determining the useful current which reaches the collector. More especially is this the case when the beam is space charge focussed. If maximum beam efficiency is to be obtained in klystrons having collectors of known design and construction the collector electrode must be relatively long. This is obviously a practical disadvantage and in some cases may be a serious one, for example, in the case of klystrons of large power or in cases where the available space is restricted. If the length of collector electrodes is sacrificed in order to reduce the overall length of the tube very substantial loss in efficiency may result. For example, if a known collector of the customary shape— usually cup or cone shape—is made half the length required for good beam efficiency as much as 10 percent of the useful beam current may be lost.

Experiment has shown that the reason for the loss of useful beam current which follows upon reduction of the length of the collector electrode of a klystron is that secondary electrons and elastic collisions from the internal walls of the collector build up a space charge which in effect drives a wedge into the beam causing it to diverge in the region of the output gap and collector, thus resulting in decrease in the beam efficiency and lack of efficient electron bunching at the output gap. The present invention seeks to avoid the foregoing defects and disadvantages of known collector electrodes.

According to this invention a collector electrode for a klystron tube is provided with means for preventing the building up of a substantial concentrated space charge in the region of said electrode. In this way the above mentioned effect is avoided and the collector electrode ray, for a given beam efficiency, be made substantially shorter than would otherwise be possible. The electrode is preferably of over-all conical or cup shape but will be substantially shorter than a comparable known electrode of like beam efficiency.

Broadly speaking there are two ways of carrying out the invention. In the first and preferred way the collector electrode is provided with a plurality of members projecting from its internal surface and which function by splitting up the space charge thus preventing its concentration. Expedients which may be employed in this way of carrying out the invention include the provision of internal radially projecting vanes; the provision of internal concentric cylinders co-axial with the electrode; and the provision of internal pins or spikes running parallel to the axis of the electrode.

In another way of carrying out the invention the building up of a strong space charge is prevented by coating the electrode internally with material of low secondary emission, preferably carbon.

The invention is illustrated in the accompanying drawings which show four embodiments thereof. In all four embodiments the overall shape of the collector electrode is conical. Figs. 1, 3, 5 and 7 are views looking into the mouth of the cone in each case and Figs. 2, 4, 6 and 8 are the corresponding side views half sectioned on the center lines 2—2, 4—4, 6—6, and 8—8 of Figs. 1, 3, 5 and 7 respectively. Fig. 9 illustrates an electrode assembly employing the collector electrode of Figs. 1-8.

Figure 2:
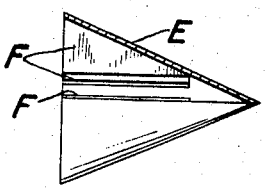

The construction in Figs. 1 and 2 consists of a conical collector electrode E containing a plurality (as shown eight) of internally radially projecting metal fins or vanes F. Fig. 9 represents a typical assembly of the conically-shaped collector electrode equipped with means for splitting up the space charge and preventing its concentration. The vessel 1 encloses the cathode 2, the grids 3, 4, 5 and 6 and the conically-shaped collector electrode 7. In the embodiment illustrated the internal surface of cone E contains radially disposed fins or vanes F terminating around the cylindrical space S.

The fins or vanes F are arranged in sets connected with the interior of the conical wall of the conical collector electrode E and extending inwardly in radial coplanar alignment terminating in an axially extending substantially cylindrical space or gap designated at S in Fig. 1.

Figure 3:
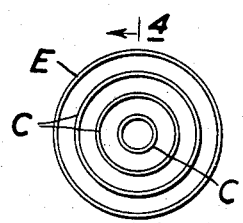
Figure 4:
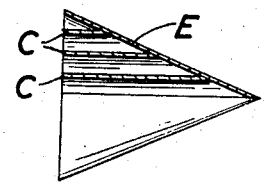

In the modification shown in Figs. 3 and 4 the fins F of Figs. 1 and 2 are replaced by concentric cylinders C (three are shown in this particular embodiment) which are co-axial with the electrode.

Figure 5:
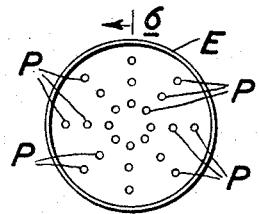
Figure 6:
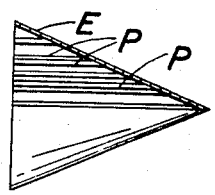

In the further modification shown in Figs. 5 and 6 rings of spikes or pins P are used, these pins running parallel to the axis of the collector electrode.

The constructions of Figs. 1 to 6 inclusive are examples of the first and preferred way of carrying out the invention, i.e. that in which a concentration of space charge is prevented. By using constructions of this nature which result in breaking up or splitting up the space charge, the overall length of the collector electrode for a given beam efficiency can be substantially reduced as compared to that which would be necessary were the said electrode of the usual plain conical or cup form.

Figure 7:
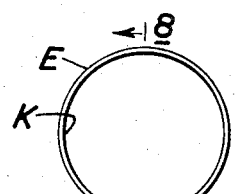
Figure 8:
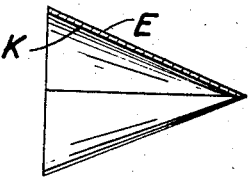
Figure 9:
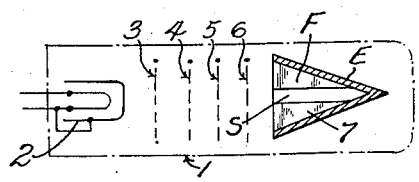

In the modification shown in Figs. 7 and 8 the building up of a strong space charge (as distinct from the breaking or splitting up of the charge) is prevented by internally coating the electrode E with a layer of material of low secondary emission properties, preferably carbon. This layer is schematically represented in Figs. 7 and 8 by the thickening K on the inside of the electrode E. In practice the deposited carbon would not be as thick as indicated in Figs. 7 and 8, a deposit of a few thousandths of an inch thick being sufficient.

I claim:

1. A klystron tube comprising a cathode, a collector electrode shaped as a hollow cone having its internal surface substantially facing the cathode of said tube, said cone being provided with a plurality of radially disposed vanes connected to the internal surface of said cone and terminating at the internal edges thereof substantially parallel to the axis of the cone substantially to the plane of the base of the cone and operating to split up a substantial concentrated space charge in the vicinity of said cone.

2. A klystron tube as set forth in claim 1 in which the internal edges of said radially disposed vanes surround a substantially cylindrical space disposed axially of said cone.

3. A klystron tube as set forth in claim 1 in which said radially disposed vanes are arranged in sets coplanar with each other on opposite sides of the axis of the cone.

References Cited in the file of this patent

UNITED STATES PATENTS

| | | |
|---|---|---|
| 1,852,865 | Upp | Apr. 5, 1932 |
| 2,107,520 | Schade | Feb. 8, 1938 |
| 2,325,865 | Litton | Aug. 3, 1943 |
| 2,409,694 | Laidaig | Oct. 22, 1946 |
| 2,460,141 | McArthur | Jan. 25, 1949 |
| 2,480,133 | Hansen | Aug. 30, 1949 |
| 2,530,703 | Jonker | Nov. 21, 1950 |
| 2,619,611 | Norton et al. | Nov. 25, 1952 |
| 2,680,209 | Veronda | June 1, 1954 |
| 2,777,085 | Gleason | Jan. 8, 1957 |